United States Patent

Yamauchi et al.

Patent Number: 5,852,095
Date of Patent: Dec. 22, 1998

[54] AQUEOUS, SILICONE-MODIFIED ACRYLATE POLYMER EMULSION

[75] Inventors: Toyoaki Yamauchi, Yokohama; Yasuyuki Kamiyama, Zushi, both of Japan

[73] Assignee: Asahi Kasei Kogyo Kabushiki Kaisha, Osaka, Japan

[21] Appl. No.: 669,544

[22] PCT Filed: Sep. 2, 1994

[86] PCT No.: PCT/JP94/01458

§ 371 Date: Jul. 10, 1996

§ 102(e) Date: Jul. 10, 1996

[87] PCT Pub. No.: WO95/29196

PCT Pub. Date: Nov. 2, 1995

[30] Foreign Application Priority Data

Apr. 20, 1994 [JP] Japan ................................. 6-81855

[51] Int. Cl.$^6$ .................................................... C08F 2/16
[52] U.S. Cl. .................. 524/460; 524/262; 524/263; 524/264; 524/265; 524/266; 524/457; 524/458; 524/506; 524/533; 524/547; 524/730; 524/731; 524/806; 524/817; 524/535
[58] Field of Search .................................. 524/262, 263, 524/506, 458, 460, 533, 535, 547, 730, 731, 806, 817, 457, 264, 265, 266

[56] References Cited

U.S. PATENT DOCUMENTS

| | | | |
|---|---|---|---|
| 3,706,697 | 12/1972 | Backderf | 524/806 X |
| 4,716,194 | 12/1987 | Walker et al. | 524/806 |
| 4,994,538 | 2/1991 | Lee | 524/806 |
| 5,100,955 | 3/1992 | Pons et al. | 524/806 X |
| 5,204,404 | 4/1993 | Werner, Jr. et al. | 524/806 X |
| 5,214,095 | 5/1993 | Lavoie | 524/806 |
| 5,240,992 | 8/1993 | Yamaya | 524/806 |
| 5,322,890 | 6/1994 | Ando et al. | 524/806 |
| 5,399,618 | 3/1995 | Jenkins et al. | 524/806 X |
| 5,459,719 | 10/1995 | Asanaka et al. | 523/201 |
| 5,462,988 | 10/1995 | Doi et al. | 524/806 X |
| 5,489,645 | 2/1996 | Tahara et al. | 524/817 |
| 5,494,974 | 2/1996 | Asanaka et al. | 525/309 |
| 5,576,384 | 11/1996 | Nölken et al. | 524/806 |

FOREIGN PATENT DOCUMENTS

| | | | |
|---|---|---|---|
| 842 947 | 5/1970 | Canada . | |
| 0224795 | 6/1987 | European Pat. Off. | 524/806 |
| 0 401 496 A2 | 12/1990 | European Pat. Off. . | |
| 0203738 | 11/1984 | Japan | 524/806 |
| 0217702 | 12/1984 | Japan | 524/817 |
| 0127371 | 7/1985 | Japan | 524/806 |
| 0048601 | 1/1986 | Japan | 524/806 |
| 63-77531 | 4/1988 | Japan . | |
| 5-310857 | 11/1993 | Japan . | |
| 6-122734 | 5/1994 | Japan . | |
| 6-136324 | 5/1994 | Japan . | |
| 1350282 | 4/1974 | United Kingdom | 524/817 |

*Primary Examiner*—Judy M. Reddick
*Attorney, Agent, or Firm*—Pennie & Edmonds LLP

[57] ABSTRACT

Disclosed is an aqueous, silicone-modified acrylate polymer emulsion, which is an acrylate polymer emulsion produced by subjecting a monomer system (A) comprising an acrylate monomer selected from the group consisting of an acrylic ester, a methacrylic ester and a mixture thereof to emulsion polymerization in an aqueous medium in the presence of emulsifier (B) selected from the group consisting of a sulfonic acid group-containing ethylenically unsaturated monomer, a sulfonate group-containing ethylenically unsaturated monomer, and a mixture thereof, wherein the acrylate polymer emulsion is silicone-modified using a specific, silicone structure-containing modifier (C) during or after the emulsion polymerization. The aqueous, silicone-modified acrylate polymer emulsion of the present invention is capable of forming a coating having excellent water repellency, water resistance, weatherability, dispersion characteristics of pigment, gloss retentivity, stain resistance and adhesion properties, and therefore can be advantageously used as a paint, an undercoating or finish coating material for building materials, an adhesive, a pressure-sensitive adhesive, a processing agent for papers, or a finish coating material for textile fabrics, especially as a paint, or a finish coating material for building materials.

17 Claims, No Drawings

AQUEOUS, SILICONE-MODIFIED ACRYLATE POLYMER EMULSION

BACKGROUND OF THE INVENTION

Technical Field

The present invention relates to an aqueous, silicone-modified acrylate polymer emulsion which is capable of forming a coating having excellent water repellency, water resistance, weatherability, dispersion characteristics of pigment, gloss retentivity, stain resistance and adhesion properties. More particularly, the present invention is concerned with an aqueous, silicone-modified acrylate polymer emulsion, which is an acrylate polymer emulsion produced by subjecting a monomer system (A) comprising an acrylate monomer selected from the group consisting of an acrylic ester, a methacrylic ester and a mixture thereof to emulsion polymerization in an aqueous medium in the presence of an emulsifier (B) selected from the group consisting of a sulfonic acid group-containing ethylenically unsaturated monomer, a sulfonate group-containing ethylenically unsaturated monomer, and a mixture thereof, wherein the acrylate polymer emulsion is silicone-modified using a specific, silicone structure-containing modifier (C) during or after the emulsion polymerization. The aqueous, silicone-modified acrylate polymer emulsion of the present invention can be advantageously used as a paint, an undercoating or finish coating material for building materials, an adhesive, a pressure-sensitive adhesive, a processing agent for papers, or a finish coating material for textile fabrics, especially as a paint, or a finish coating material for building materials.

Prior Art

When an aqueous acrylate polymer emulsion obtained by emulsion polymerization is dried at room temperature or under heated conditions, a coating is obtained which has a relatively good durability. Therefore, the aqueous acrylate polymer emulsion has been widely used as a resin for an aqueous paint. However, when a coating, which is obtained from an acrylate polymer emulsion or from a paint comprising an acrylate polymer emulsion having a pigment incorporated therein, is exposed to outdoor conditions or ultraviolet light, not only is the luster of the coating likely to be rapidly deteriorated but also the gloss retentivity of the coating is poor.

For solving the problems as mentioned above, it was conventionally proposed to add a silicone to an aqueous acrylate polymer emulsion to increase the resistance of a coating formed from the emulsion to ultraviolet light, oxygen, water and various types of solvents, and improve the durability of the coating. With respect to prior art documents which disclose such a technique, reference can be made to Canadian Patent No. 842947, U.S. Pat. No. 3,706,697, Unexamined Japanese Patent Application Laid-Open Specification No. 3-255273 and Unexamined Japanese Patent Application Laid-Open Specification No. 6-122734. However, the emulsions disclosed in these documents have poor water resistance. The reason for this resides in that an emulsifier employed in the technique of each of the above documents does not have a reactivity with the emulsified particles of the aqueous acrylate polymer emulsion but is only adsorbed on the emulsified particles, so that it is likely that water intrudes into the emulsified particles. In European Patent No. 0 401 496, a sulfonic acid group-containing ethylenically unsaturated monomer is employed. However, in European Patent No. 0 401 496, styrene is used in a large amount which is almost the same as the amount of acrylic ester employed and, therefore, the obtained emulsion is disadvantageous in that a coating formed from the emulsion is discolored upon exposure to ultraviolet light and has poor weatherability. In U.S. Pat. No. 5,214,095, an ethylenically unsaturated monomer and a hydrolyzable silane are simultaneously introduced into an emulsion polymerization system in the presence of an aqueous solvent, so that the obtained aqueous emulsion has poor dispersion stability. Even if a dispersant or emulsifier, as a stabilizing agent, is added to this aqueous emulsion, when a coating formation promotor or an inorganic pigment is added to the aqueous emulsion, coagulation of the aqueous emulsion is likely to occur. In this case, even when a coating formation promotor or an inorganic pigment can be mixed with the aqueous emulsion without suffering from the occurrence of coagulation, a coating obtained from the emulsion has poor gloss. Further, a large amount of stabilizing agent must be used and, therefore, the coating obtained from the emulsion has poor water resistance.

As mentioned above, the conventional aqueous acrylate polymer emulsions have problems such that these emulsions have poor water resistance or poor weatherability, and coatings obtained from such emulsions having a pigment incorporated therein are unsatisfactory with respect to luster even just after the coating operation. Further, when the coating is exposed to outdoor conditions, especially ultraviolet light, for a prolonged period of time, the luster of the coating is drastically deteriorated. Further, there has recently been an increasing demand in the art for further improvement of various properties of aqueous acrylate polymer emulsions.

SUMMARY OF THE INVENTION

In these situations, the present inventors have made extensive and intensive studies with a view toward solving the above-mentioned problems accompanying the conventional aqueous acrylate polymer emulsions. As a result, it has unexpectedly been found that an aqueous, silicone-modified acrylate polymer emulsion as mentioned below is capable of providing a coating which not only has excellent water resistance, but also can retain luster for a prolonged period of time. The above-mentioned aqueous, silicone-modified acrylate polymer emulsion consists in an acrylate polymer emulsion produced by subjecting a monomer system (A) comprising an acrylate monomer selected from the group consisting of an acrylic ester, a methacrylic ester and a mixture thereof to emulsion polymerization in an aqueous medium in the presence of an emulsifier (B) selected from the group consisting of a sulfonic acid group-containing ethylenically unsaturated monomer, a sulfonate group-containing ethylenically unsaturated monomer, and a mixture thereof, wherein the acrylate polymer emulsion is silicone-modified using a specific, silicone structure-containing modifier (C) during or after the emulsion polymerization.

Accordingly, it is an object of the present invention to provide a novel aqueous, silicone-modified acrylate polymer emulsion which is capable of providing a coating having excellent water repellency, water resistance, weatherability, dispersion characteristics of pigment, gloss retentivity, stain resistance and adhesion properties.

The foregoing and other objects, features and advantages will be apparent to those skilled in the art from the following detailed description and claims.

DETAILED DESCRIPTION OF THE INVENTION

According to the present invention, there is provided an aqueous, silicone-modified acrylate polymer emulsion, which is an acrylate polymer emulsion produced by subjecting a monomer system (A) to emulsion polymerization in an aqueous medium in the presence of an emulsifier (B), wherein the acrylate polymer emulsion is silicone-modified using a silicone structure-containing modifier (C) during or after the emulsion polymerization;

wherein the monomer system (A) comprises an acrylate monomer selected from the group consisting of an acrylic ester, a methacrylic ester and a mixture thereof;

wherein the emulsifier (B) is selected from the group consisting of a sulfonic acid group-containing ethylenically unsaturated monomer, a sulfonate group-containing ethylenically unsaturated monomer, and a mixture thereof; and wherein the silicone structure-containing modifier (C) comprises a silicone structure-containing silane (I) represented by the formula:

$$R^1-Si-(R^2)_3 \qquad (I)$$

wherein $R^1$ represents a hydrogen atom, a $C_1-C_{16}$ aliphatic hydrocarbon group, a $C_5-C_{10}$ aryl group, a $C_5-C_6$ cycloalkyl group, a vinyl group, an acrylic $C_1-C_{10}$ alkyl group or a methacrylic $C_1-C_{10}$ alkyl group, and each $R^2$ independently represents a $C_1-C_8$ alkoxy group, an acetoxy group or a hydroxyl group.

In the aqueous, silicone-modified acrylate polymer emulsion of the present invention, it is preferred that the monomer system (A) and the emulsifier (B) be, respectively, used in an amount of from 80 to 99.95% by weight, more preferably 90 to 99.9% by weight, and in an amount of from 20 to 0.05% by weight, more preferably from 10 to 0.1% by weight, based on the total weight of the monomer system (A) and the emulsifier (B), and that the silicone structure-containing modifier (C) be used in an amount which satisfies the following relationships:

$$\frac{1}{2} \leq \frac{(A)+(B)}{(C)} \leq \frac{99}{1}$$

wherein (A), (B) and (C), respectively, represent amounts of the monomer system (A), the emulsifier (B) and the modifier (C) in terms of weight percentages based on the total weight of materials (A), (B) and (C).

Further, in the aqueous, silicone-modified acrylate polymer emulsion of the present invention, the ratio of the total weight of the monomer system (A), the emulsifier (B) and the modifier (C) to the weight of the aqueous medium is preferably 75/25 or less, more preferably from 30/70 to 70/30.

In the present invention, the monomer system (A) comprises an acrylate monomer selected from the group consisting of an acrylic ester, a methacrylic ester and a mixture thereof.

In the present invention, the monomer system (A) may further comprise a comonomer copolymerizable with the acrylate monomer, and which comonomer is at least one member selected from the group consisting of an acrylamide monomer, a methacrylamide monomer, a vinyl monomer and a carboxylic acid group-containing ethylenically unsaturated monomer. In the monomer system (A), it is preferred that the acrylate monomer and the comonomer be, respectively, present in an amount of from 90% to less than 100% by weight and in an amount of from 10% by weight or less, based on the total weight of the acrylate monomer and the comonomer.

Examples of (meth)acrylic esters which can be used in the present invention as the acrylate monomer of the monomer system (A) include a $C_1-C_{18}$ alkyl ester of (meth)acrylic acid, a $C_1-C_{18}$ hydroxyalkyl ester of (meth)acrylic acid, a (poly)oxyethylene mono(meth)acrylate having 1 to 100 ethylene oxide groups, a (poly)oxypropylene mono(meth)acrylate having 1 to 100 propylene oxide groups and a (poly)oxyethylene di(meth)acrylate having 1 to 100 ethylene oxide groups.

Specific examples of $C_1-C_{18}$ alkyl esters of (meth)acrylic acid include methyl (meth)acrylate, ethyl (meth)acrylate, n-butyl (meth)acrylate, isobutyl (meth)acrylate, 2-ethylhexyl (meth)acrylate and dodecyl (meth)acrylate. Specific examples of $C_1-C_{18}$ hydroxyalkyl esters of (meth)acrylic acid include 2-hydroxyethyl (meth)acrylate and 2-hydroxypropyl (meth)acrylate. Specific examples of (poly)oxyethylene mono(meth)acrylates include ethylene glycol (meth)acrylate, ethylene glycol methoxy(meth)acrylate, diethylene glycol (meth)acrylate, diethylene glycol methoxy(meth)acrylate, tetraethylene glycol (meth)acrylate and tetraethylene glycol methoxy(meth)acrylate. Specific examples of (poly)oxypropylene mono(meth)acrylates include propylene glycol (meth)acrylate, propylene glycol methoxy(meth)acrylate, dipropylene glycol (meth)acrylate, dipropylene glycol methoxy(meth)acrylate, tetrapropylene glycol (meth)acrylate and tetrapropylene glycol methoxy (meth)acrylate. Specific examples of (poly)oxyethylene di(meth)acrylates include ethylene glycol di(meth)acrylate, diethylene glycol di(meth)acrylate, triethylene glycol di(meth)acrylate and tetraethylene glycol di(meth)acrylate. Specific examples of (meth)acrylic esters other than mentioned above include glycidyl (meth)acrylate and trimethylolpropane tri(meth)acrylate.

In the aqueous, silicone-modified acrylate polymer emulsion of the present invention, it is more preferred that the comonomer as an optional component of the monomer system (A) be a carboxylic acid group-containing ethylenically unsaturated monomer. Further, it is especially preferred that the carboxylic acid group-containing ethylenically unsaturated monomer be at least one member selected from the group consisting of acrylic acid, methacrylic acid, itaconic acid and a half ester thereof, fumaric acid and a half ester thereof, and maleic acid and a half ester thereof. These carboxylic acid group-containing ethylenically unsaturated monomers are preferred because these monomers also function as a catalyst which facilitates the hydrolyzation reaction and condensation reaction of hydrolyzable silanes.

As mentioned above, in the present invention, as examples of comonomers which are copolymerizable with the acrylate monomer, in addition to the above-mentioned carboxylic acid group-containing ethylenically unsaturated monomers, there can be mentioned an acrylamide monomer, a methacrylamide monomer, a vinyl monomer and the like. Specific examples of acrylamide monomers and methacrylamide monomers include (meth)acrylamide, diacetone (meth)acrylamide, N-methylol (meth)acrylamide and N-butoxymethyl (meth)acrylamide. Specific examples of vinyl monomers include vinyl acetate, vinyl propionate, vinyl ester of versatic acid (manufactured sold by Shell Chemical Co., U.S.A. under the trade name of Veo Va.), vinyl pyrrolidone, methyl vinyl ketone and a vinyl cyanide, such as acrylonitrile and methacrylonitrile.

Examples of comonomers other than mentioned above, which can be used in the present invention, include aromatic monomers, such as vinyl toluene, styrene and α-methylstyrene; hologenated vinyls, such as vinyl chloride and vinylidene chloride; butadiene; and ethylene.

In the present invention, it is preferred that the acrylate monomer of the monomer system (A) contain 5% or more, based on the weight of the monomer system (A), of a $C_5-C_{12}$ cycloalkyl ester of acrylic acid, a $C_5$–$C_{12}$ cycloalkyl ester of methacrylic acid or a mixture thereof, in which the cycloalkyl moiety of the cycloalkyl ester is unsubstituted or substituted with a $C_1$–$C_6$ alkyl group, a hydroxyl group or an epoxy group. In the present invention, when the monomer system (A) contains 5% or more, based on the weight of the monomer system (A), of a $C_5$–$C_{12}$ cycloalkyl ester of acrylic acid, a $C_5$–$C_{12}$ cycloalkyl ester of methacrylic acid or a mixture thereof, the aqueous, silicone-modified acrylate polymer emulsion of the present invention can form a coating which is excellent especially with respect to weatherability.

Examples of the above-mentioned $C_5$–$C_{12}$ cycloalkyl esters of acrylic acid or methacrylic acid include compounds represented by formula (1):

wherein $R^1$ represents a hydrogen atom or a methyl group; and $R^2$ represents a cyclopentyl group, a cyclohexyl group or a cyclododecyl group, which is unsubstituted or substituted with a $C_1$–$C_6$ alkyl group, a hydroxyl group or an epoxy group.

Specific examples of compounds represented by formula (1) above include cyclohexyl (meth)acrylate, 2-hydroxycyclohexyl (meth)acrylate, methylcyclohexyl (meth)acrylate and 2,3-epoxycyclohexane (meth)acrylate.

In the present invention, it is preferred that the sulfonic acid group- or sulfonate group-containing ethylenically unsaturated monomer of the emulsifier (B) be selected from radically polymerizable double bond-containing compounds having a sulfonic acid group, or an ammonium or an alkali metal salt thereof (i.e., ammonium sulfonate group or alkali metal sulfonate group). Among these compounds, more preferred are radically polymerizable double bond-containing compounds having a substituent selected from the group consisting of a $C_1$–$C_{20}$ alkyl group, a $C_2$–$C_4$ alkyl ether group, a poly-$C_2$–$C_4$ alkyl ether group, a $C_6$ or $C_{10}$ aryl group, and a succinic acid group, each of which is substituted with a sulfonic acid group which is in the form of an ammonium, a sodium or a potassium salt thereof, or vinyl sulfonate compounds having a vinyl group bonded to a sulfonic acid group which is in the form of an ammonium, a sodium or a potassium salt thereof.

Specific examples of compounds having a succinic acid group which is substituted with a sulfonic acid group which is in the form of an ammonium, a sodium or a potassium salt thereof include allylsulfosuccinates which, for example, can be represented by a formula 5 selected from the following formulae (2), (3), (4) and (5):

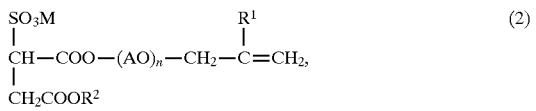

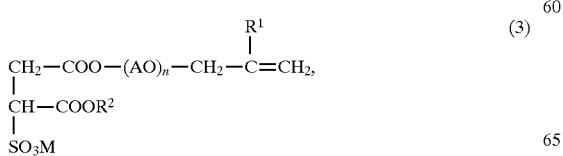

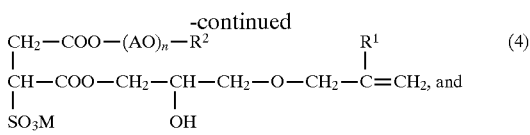

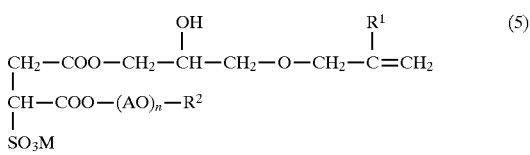

wherein $R^1$ represents a hydrogen atom or a methyl group; $R^2$ represents a hydrocarbon group, such as a $C_1$–$C_{20}$ alkyl group, a $C_1$–$C_{20}$ alkenyl group, a $C_5$–$C_{12}$ cycloalkyl group, a $C_5$–$C_{10}$ aryl group or a $C_6$–$C_{19}$ aralkyl group, each of which is unsubstituted or partially substituted with a hydroxyl group, a carboxyl group or the like, or an organic group containing an alkylene oxide, such as a polyoxyalkylene alkyl ether group (in which the alkylene moiety has 2 to 4 carbon atoms and the alkyl moiety has 0 to 20 carbon atoms) or a polyoxyalkylene alkylphenyl ether group (in which the alkylene moiety has 2 to 4 carbon atoms and an alkyl moiety has 0 to 20 carbon atoms); A represents the unsubstituted or substituted $C_2$-$C_4$ alkylene group; n represents an integer of from 0 to 200; and M represents an ammonium group, a sodium atom or a potassium atom.

Specific examples of commercially available products which comprise compounds represented by formulae (2) and (3) above include Eleminol® JS-2 (manufactured and sold by SANYO CHEMICAL INDUSTRIES, LTD., Japan). Specific examples of commercially available products which comprise compounds represented by formulae (4) and (5) above include Latemul® S-120, S-180A and S-180 (manufactured and sold by Kao Corp., Japan).

Specific examples of compounds having a $C_2$–$C_4$ alkyl ether group or a poly-$C_2$-$C_4$ alkyl ether group, each of which is substituted with a sulfonic acid group which is in the form of an ammonium, a sodium or a potassium salt thereof, include compounds represented by a formula selected from the following formulae (6) and (7):

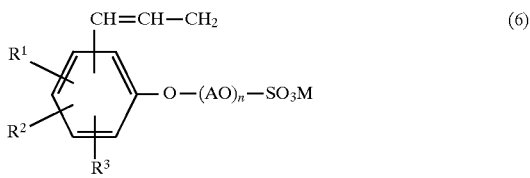

wherein $R^1$ represents a $C_6$–$C_{18}$ alkyl, alkenyl or aralkyl group; $R^2$ represents a $C_6$–$C_{18}$ alkyl, alkenyl or aralkyl group; $R^3$ represents a hydrogen atom or a propenyl group; A represents $C_2$–$C_4$ alkylene group; n represents an integer of from 1 to 200.; and M represents an ammonium group, a sodium atom or a potassium atom, and

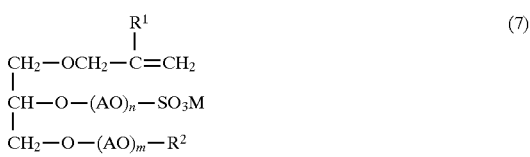

wherein $R^1$ represents a hydrogen atom or a methyl group; $R^2$ represents a $C_8$–$C_{24}$ alkyl or acyl group; A represents $C_2$–$C_4$ alkylene group; n represents an integer of from 0 to 20; m represents an integer of from 0 to 50; and M represents an ammonium group, a sodium atom or a potassium atom.

Specific examples of alkylphenol ether compounds represented by formula (6) above include Aquaro® HS-10 (manufactured and sold by Dai-ichi Kogyo Seiyaku Co., Ltd., Japan). Specific examples of compounds represented by formula (7) above include Adeka Rea soap® SE-1025N (manufactured and sold by ASAHI DENKA KOGYO K. K., Japan).

Specific examples of compounds having a $C_6$ or $C_{10}$ aryl group which is substituted with a sulfonate group include a p-styrenesulfonic acid which is in the form of an ammonium, a sodium or a potassium salt thereof. Specific examples of compounds having a $C_1$–$C_{20}$ alkyl group which is substituted with a sulfonate group include methylpropanesulfonacrylamide which is in the form of an ammonium, a sodium or a potassium salt thereof, a sulfoalkyl acrylate which is in the form of an ammonium, a sodium or a potassium salt thereof, and sulfoalkyl methacrylate which is in the form of an ammonium, a sodium or potassium salt thereof. Specific examples of sulfonate group-containing compounds other than mentioned above include a vinyl sulfonate compound having a vinyl group bonded to a sulfonic acid group which is in the form of an ammonium, a sodium or a potassium salt thereof.

The ethylenically unsaturated monomer used as emulsifier (B) can be present in the emulsion in any of the following states:

(i) the ethylenically unsaturated monomer is present in the emulsion as a copolymer thereof with the emulsified particles of the acrylate polymer emulsion, which copolymer is formed by radical polymerization;

(ii) the ethylenically unsaturated monomer is adsorbed on the emulsified particles of the acrylate polymer emulsion or present in the aqueous phase of the acrylate polymer emulsion, in the form of an unreacted monomer; and (iii) the ethylenically unsaturated monomer is adsorbed on the emulsified particles of the acrylate polymer emulsion or present in the aqueous phase of the acrylate polymer emulsion, in the form of a copolymer thereof with a water-soluble monomer or a polymer of the ethylenically unsaturated monomers. In this connection, it is noted that the higher the ratio of the ethylenically unsaturated monomers which are present in state (i) above, the higher the water resistance of the coating formed from the final emulsion.

The ethylenically unsaturated monomer used as emulsifier (B) can be identified by subjecting a coating obtained from the emulsion to a pyrolysis gas chromatography/mass spectrometry (Py-GC-MS) or a pyrolysis mass spectrometry (Py-MS). Alternatively, the ethylenically unsaturated monomers can be identified by a method in which the aqueous phase is separated from the emulsion and the residue is subjected to fast atom bombardment mass spectrometry (FAB mass spectrometry).

In the present invention, the silicone structure-containing modifier (C) comprises a silicone structure-containing silane (I) represented by the formula:

wherein $R^1$ represents a hydrogen atom, a $C_1$–$C_{16}$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, and each $R^2$ independently represents a $C_1$–$C_8$ alkoxy group, an acetoxy group or a hydroxyl group.

The term "(meth)acrylic alkyl group" used herein means a group derived from an alkyl (meth)acrylate, in which group the alkyl moiety has a free valence.

In formula (I) above, it is preferred that $R^1$ represent a methyl group, a phenyl group, a vinyl group or a γ-(meth)acryloxypropyl group and each $R^2$ independently represent a methoxyl group, an ethoxyl group a propoxyl group, a methoxyethoxyl group or a hydroxyl group. Preferred specific examples of silanes (I) represented by formula (I) above include methyltri-methoxysilane, phenyltrimethoxysilane, methyltriethoxysilane, phenyltriethoxysilane, isobutyltrimethoxysilane, vinyltriethoxysilane, γ-acryloxypropyltrimethoxysilane, γ-acryloxypropyltriethoxysilane, γ-methacryloxypropyltrimethoxysilane and γ-methacryloxypropyltriethoxysilane. These silanes may be contained in modifier (C) individually or in combination.

In the present invention, the silicone structure-containing modifier (C) may further comprise at least one member selected from the group consisting of a cyclic silane, a hydrolyzable group-containing linear siloxane and a silane (II) represented by the formula:

wherein each $R^3$ independently represents a hydrogen atom, a $C_1$-$Cl_6$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, each $R^4$ independently represents a $C_1$–$C_8$ alkoxy group, an acetoxy group or a hydroxyl group, and n is 0, 2 or 3.

The molar ratio of the silane (I) to at least one member selected from the group consisting of a cyclic silane, a hydrolyzable group-containing linear siloxane and a silane (II) may be at least 10/100, preferably 35/100 or more.

In the present invention, the silicone structure-containing modifier (C) may further comprise at least one member selected from the group consisting of a cyclic silane and a silane (III) represented by the formula:

wherein each R3 independently represents a hydrogen atom, a $C_1$–$C_{16}$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, and each $R^4$ independently represents a $C_1$–$C_8$ alkoxy group, an acetoxy group or a hydroxyl group.

The molar ratio of the silane (I) to at least one member selected from the group consisting of a cyclic silane and a silane (III) may be at least 10/100, preferably 35/100 or more.

In formulae (II) and (III) above, it is especially preferred that each $R^3$ independently represent a methyl group or a phenyl group, and each $R^4$ independently represent a methoxy group, an ethoxy group, a propoxy group, a butoxy group, a methoxyethoxy group or a hydroxyl group.

With respect to the modifier (C), it is especially preferred that the modifier (C) further comprise at least one member selected from the group consisting of a cyclic silane and silane (III) represented by formula (III). By the use of silane (III) or a cyclic silane in combination with silane (I), it becomes possible to lower the cross-linking density of a silicone polymer formed from modifier (C), thereby preventing the silicone polymer from having a complicated structure, so that a coating obtained from the emulsion can be imparted with a softness.

Specific examples of silanes of formula (II), exclusive of those which are represented by formula (III), include phenyltrimethoxysilane, trimethylmethoxysilane and tetraethoxysilane.

Examples of hydrolyzable group-containing linear siloxanes include compounds represented by a formula selected from the following formulae (IV), (V) and (VI):

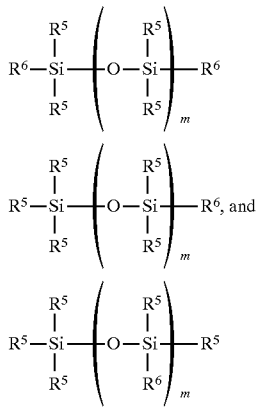

wherein each $R^5$ independently represents a hydrogen atom, a $Cl-Cl_6$ aliphatic hydrocarbon group, a $C_5-C_{10}$ aryl group, a C5 or $C_6$ cycloalkyl group, a vinyl group, an acrylic $C_1-C_{10}$ alkyl group or a methacrylic $C_1-C_{10}$ alkyl group; each $R^6$ independently represents a $C_1-C_8$ alkoxy group, an acetoxy group, a hydroxyl group, an epoxy group or an ethylene oxide group; and m represents an integer of from 1 to 999.

Specific examples of silane (III) include dimethyldimethoxysilane, diphenyldimethoxysilane, dimethyldiethoxysilane, diphenyldiethoxysilane, methylphenyldimethoxysilane and γ-methacryoxypropylmethyldimethoxysilane.

Examples of cyclic silanes which can be used in the present invention include octamethylcyclotetrasiloxane, octaphenylcyclosiloxane, hexamethylcyclotrisiloxane, decamethylcyclopentasiloxane and tetramethyltetravinylcyclotetrasiloxane. With respect to these cyclic silanes, reference can be made to Canadian Patent No. 842947.

In addition to at least one compound selected from the group consisting of the above-mentioned silane (II), silane (III), cyclic silane and linear siloxane, the modifier (C) can further comprise a chlorosilane, such as methylchlorosilane, methyldichlorosilane, dimethyldichlorosilane, trimethylchlorosilane, phenyltrichlorosilane, diphenylchlorosilane, vinylchlorosilane, γ-(meth)acryloxypropyltrichlorosilane and γ-(meth)acryloxypropyldichloromethylsilane.

In the present invention, when the above-mentioned modifier (C) is introduced into an emulsion polymerization system comprising the monomer system (A) and the specific emulsifier (B), the silane undergoes hydrolysis and condensation, so that a silicone is formed in the emulsified particles of the acrylate polymer emulsion obtained. Accordingly, due to the silicone formed in the emulsified particles of the acrylate polymer emulsion, a coating formed from the emulsion has an extremely excellent weatherability and gloss retentivity. For example, when a coating formed from a paint comprising a conventional acrylic emulsion having a titanium dioxide or the like incorporated therein is exposed to outdoor conditions for a prolonged period of time, the coating rapidly loses luster, and also exhibits a low gloss retentivity, whereas, even when a coating obtained from a paint comprising the aqueous, silicone-modified acrylate polymer emulsion of the present invention having a titanium dioxide or the like incorporated therein is exposed to outdoor conditions, the coating is unlikely to lose luster, and exhibits excellent gloss retentivity.

The presence of the above-mentioned condensation product of silane can be identified by means of $^{29}Si$-NMR ($^{29}Si$ nuclear magnetic resonance) or $^1H$-NMR (proton nuclear magnetic resonance). For example, the presence of the condensation product of silane (I) can be identified by the presence of a peak at −40 to −80 ppm in terms of the chemical shift of $^{29}Si$-NMR. The presence of the condensation product of silane (III) or a cyclic silane is identified by the presence of a peak at −16 to −26 ppm in terms of the chemical shift of $^{29}Si$-NMR.

In the present invention, it is preferred that the modifier (C) be added to the emulsion polymerization system, so that the silicone-modification of the emulsion is performed during the emulsion polymerization.

According to a preferred embodiment of the present invention, there is provided an aqueous, silicone-modified acrylate emulsion, wherein the monomer system (A) is comprised of monomer systems ($A^1$) and ($A^2$), each comprising the acrylate monomer, and the emulsifier (B) is comprised of emulsifiers ($B^1$) and ($B^2$), each selected from the group consisting of the sulfonic acid group-containing ethylenically unsaturated monomer, the sulfonate group-containing ethylenically unsaturated monomer, and a mixture thereof, with the proviso that monomer systems ($A^1$) and ($A^2$) are the same or different, and emulsifiers ($B^1$) and ($B^2$) are the same or different, and wherein the emulsion polymerization is conducted in a sequence of step (1) and step (2), wherein in step (1), the monomer system ($A^1$) is subjected to emulsion polymerization in an aqueous medium in the presence of the emulsifier ($B^1$) to thereby obtain a preliminary aqueous acrylate polymer emulsion having a seed latex dispersed therein, and in step (2), the monomer system ($A^2$) and the emulsifier (B2), optionally with an aqueous medium, are added to the preliminary aqueous acrylate polymer emulsion to effect emulsion polymerization thereof, thereby producing a final aqueous acrylate polymer emulsion, wherein the silicone-modification is performed using the silicone structure-containing modifier (C) during or after the emulsion polymerization.

In step (2) above, the modifier (C) can be added to the emulsion polymerization system to thereby perform the silicone-modification during the emulsion polymerization. Alternatively, the final aqueous acrylate emulsion can be treated with the modifier (C) to thereby perform the silicone-modification after the emulsion polymerization.

In step (1) above, the monomer system ($A^1$) and the emulsifier ($B^1$) can be, respectively, used in an amount of from 80 to 99.95% by weight, preferably from 90 to 99.9% by weight, and in an amount of from 0.05 to 20% by weight, preferably from 0.1 to 10% by weight, based on the total weight of the monomer system ($A^1$) and the emulsifier ($B^1$). In step (2) above, the monomer system ($A^2$) and the emulsifier ($B^2$) can be, respectively, used in an amount of from 80 to 99.95% by weight, preferably from 90 to 99.9% by weight, and in an amount of from 0.05 to 20% by weight, preferably from 0.1 to 10% by weight, based on the total weight of the monomer system ($A^2$) and the emulsifier ($B^2$). The silicone structure-containing modifier (C) can be used in an amount which satisfies the following relationships:

$$\frac{1}{2} \leq \frac{(A^1) + (A^2) + (B^1) + (B^2)}{(C)} \leq \frac{99}{1}$$

wherein $(A^1)$, $(A^2)$, $(B^1)$, $(B^2)$ and $(C)$, respectively, represent amounts of monomer system $(A^1)$, monomer system $(A^2)$, emulsifier $(B^1)$, emulsifier $(B^2)$ and modifier $(C)$ in terms of weight percentages, based on the total weight of materials $(A^1)$, $(A^2)$, $(B^1)$, $(B^2)$ and $(C)$.

The ratio of the total weight of the monomer system $(A^1)$ and the emulsifier $(B^1)$ to the total weight of the monomer system $(A^2)$ and the emulsifier $(B^2)$ is from 1/99 to 99/1, preferably from 5/95 to 95/5.

When $(A^1)$, $(A^2)$, $(B^1)$, $(B^2)$ and $(C)$ are used in the amount relationships as defined above, the emulsion can be very stably obtained and the obtained emulsion is capable of forming a coating which has especially excellent water resistance and weatherability.

In step (1) above, it is preferred that the monomer system $(A^1)$ contain 0.5 to 30% by weight, more preferably 1 to 20% by weight, of a carboxylic acid group-containing ethylenically unsaturated monomer, based on the weight of the monomer system $(A^1)$. In step (2) above, the monomer system $(A^2)$ may or may not contain 1 to 2% by weight of a carboxylic acid group-containing ethylenically unsaturated monomer, based on the weight of the monomer system $(A^2)$. The above-mentioned carboxylic acid group-containing ethylenically unsaturated monomer can be preferably employed, since it functions also as a catalyst to facilitate the hydrolyzation reaction and condensation reaction of the above-mentioned hydrolyzable group-containing silane.

In the present invention, it is preferred that the silicon content of a polymer comprising components (A), (B) and (C) be from 1 to 10% by weight, based on the weight of the polymer. When the silicon content is within the range as mentioned above, the emulsion can be very stably obtained, and the obtained emulsion can form a coating which has especially excellent water resistance and weatherability.

For producing the aqueous, silicone-modified acrylate polymer emulsion of the present invention, a conventional emulsion polymerization method can be employed. However, in the case where, in accordance with the above-mentioned preferred embodiment, the emulsion polymerization is conducted in a sequence of two steps [step (1) and step (2)] [wherein a preliminary aqueous acrylate polymer emulsion having a seed latex dispersed therein is prepared in step (1), and the preliminary aqueous acrylate polymer emulsion obtained in step (1) is further subjected to emulsion polymerization in step (2)], the two-step emulsion polymerization can be practiced in either of the following two manners (i) and (ii):

(i) the modifier (C) is added to the preliminary aqueous acrylate polymer emulsion having a seed latex dispersed therein at the same temperature as used in the polymerization of the preliminary aqueous acrylate polymer emulsion, and subsequently, each of the monomer system $(A^2)$ and emulsifier $(B^2)$ is introduced to the reaction system at a time or in a stepwise manner during the course of polymerization of a silane of the modifier (C); and (ii) each of the modifier (C), monomer system $(A^2)$ and emulsifier $(B^2)$ is simultaneously added at a time or in a stepwise manner to the preliminary aqueous acrylate emulsion having a seed latex dispersed therein at the same temperature as used in the polymerization of the preliminary aqueous acrylate polymer emulsion. These two manners can be employed individually or in combination. The manner of two-step emulsion polymerization is not limited to the above two manners.

Generally, the hydrogen ion concentration during the preparation of the preliminary aqueous acrylate polymer emulsion in step (1) and during the emulsion polymerization in step (2) is adjusted so as to give a pH value of 4.0 or less, preferably 3.0 or less.

In the present invention, the emulsion polymerization is conducted in an aqueous medium. As an aqueous medium, water is generally used. Alternatively, an aqueous solution of a water-soluble solvent, such as a lower alcohol having 1 to 3 carbon atoms or acetone, can be employed as an aqueous medium. In this case, the content of the solvent in the emulsion is preferably 20% or less. With respect to the obtained final emulsion, it is preferred that weight ratio of dispersed phase (solids) to aqueous medium as a dispersion medium be 70/30 or less, more preferably from 30/70 to 65/35.

In practicing the emulsion polymerization, a compound, which is decomposable by heat or a reducing agent to generate radicals and thereby initiate an addition polymerization reaction of the ethylenically unsaturated monomer, can be advantageously employed as a radical polymerization catalyst. Examples of such compounds include a water-soluble or oil-soluble persulfates, peroxides, and azobis compounds. Specific examples of such compounds include potassium persulfate, sodium persulfate, ammonium persulfate, hydrogen peroxide, t-butyl hydroperoxide, t-butyl peroxybenzoate, 2,2-azobisisobutyronitrile, 2,2-azobis(2-diamino-propane)hydrochloride and 2,2-azobis(2,4-dimethylvaler-onitrile). Of these, especially preferred are potassium persulfate, sodium persulfate and ammonium persulfate, which are effective also as a catalyst to facilitate the hydrolysis reaction and condensation reaction of the hydrolyzable silane. The radical polymerization catalyst is generally used in an amount of from 0.1 to 1% by weight, based on the weight of the ethylenically unsaturated monomer.

Generally, it is preferred that emulsion polymerization be conducted at a temperature of from 65° to 90° C. under atmospheric pressure. However, the emulsion polymerization can be conducted under high pressure, so as to, for example, prevent the monomers from being vaporized at the polymerization temperature. The polymerization time comprises an introduction time and a maturation (cooking) time. With respect to the introduction time, when each of the materials is introduced to a reaction system at a time, the introduction time is generally several minutes. When the raw materials are stepwise introduced to a reaction system, the introduction of the raw materials is conducted in a manner such that the heat generated in the polymerization reaction can be removed. Therefore, in this case, the introduction time may vary, depending on the desired content of the polymer in a final emulsion. However, the introduction time is generally 10 minutes or more. With respect to the maturation (cooking) time, it is preferred that the maturation time be 10 minutes or more. When the polymerization time is shorter than the period of time as mentioned above, there is a danger that not only do the raw materials remain unreacted, but also the hydrolyzable silanes are not condensed and remain as they are. When it is desired to increase the rate of polymerization or when it is desired to perform a polymerization reaction at a temperature as low as 70° C. or less, it is advantageous to use a reducing agent, such as sodium bisulfite, ferrous chloride, ascorbate and Rongalit, in combination with a radical polymerization catalyst. Further, if desired, in order to control the molecular weight of the polymer, a chain transfer agent, such as dodecylmercaptan, can be used.

In the present invention, in addition to the above-mentioned emulsifier (B) which is selected from the group of a sulfonic acid group-containing ethylenically unsaturated monomer, a sulfonate group-containing ethylenically unsaturated monomer, and a mixture thereof, a conventional surfactant can be used in combination with the emulsifier (B). Examples of conventional surfactants which can be used in combination with the emulsifier (B) include anionic surfactants, such as a fatty acid soap, an alkyl sulfonate, an alkyl sulfosuccinate, a polyoxyethylene alkyl sulfate, a polyoxyethylene alkylaryl sulfate; non-reactive nonionic surfactants, such as a polyoxyethylene alkylaryl ether, a sorbitan fatty acid ester of polyoxyethylene and an oxyethylene-oxy-propylene block copolymer; and reactive nonionic surfactants, such as α-{1-[(allyloxy)methyl]-2-(nonylphenoxy)ethyl}-ω-hydroxypolyoxyethylene [e.g., Adeka Rea soap NE-20, NE-30 and NE-40 (manufactured and sold by ASAHI DENKA KOGYO K. K., Japan)], a polyoxyethylene alkylpropenylphenylether [e.g., Aquaron RN-10, RN-20, RN-30 and RN-50 (manufactured and sold by Dai-ichi Kogyo Seiyaku Co., Ltd., Japan)].

With respect to the amount of the conventional surfactant in terms of % by weight, based on the weight of the emulsion: an anionic surfactant can be used in an amount of 0.5% by weight or less, preferably 0.25% by weight or less, more preferably 0.1% by weight or less; and a non-reactive nonionic surfactant or a reactive nonionic surfactant can be used in an amount of 2.0% by weight or less, preferably 1.0% by weight or less, more preferably 0.5% by weight or less. When the conventional surfactants are used in amounts which exceed the above ranges, a coating formed from the obtained aqueous, silicone-modified acrylate polymer emulsion has disadvantageously low water resistance.

In the present invention, after the termination of emulsion polymerization, a curing catalyst can be added to the aqueous, silicone-modified acrylate polymer emulsion to facilitate the formation of a coating. Examples of curing catalysts usable in the present invention include metal salts, such as dibutyltin dilaurate, dioctyltin dilaurate, dibutyltin diacetate, tin octylate, tin laurate, iron octylate, lead octylate and tetrabutyl titanate; and amine compounds, such as n-hexylamine and 1,8-diazabicyclo[5,4,0]-7-undecene.

When a water-insoluble curing catalyst is used, it is desirable that such a catalyst be emulsified using a surfactant and water prior to use.

In the present invention, from the viewpoint of maintaining the dispersion stability of the aqueous, silicone-modified acrylate polymer emulsion for a prolonged period of time, it is preferred that the pH value of the emulsion be adjusted to 5 to 10, using ammonia, sodium hydroxide, potassium hydroxide, and amines, such as dimethylaminoethanol.

In the aqueous, silicone-modified acrylate polymer emulsion of the present invention, it is preferred that the average particle diameter of the dispersed phase be from 10 to 1000 nm.

The aqueous, silicone-modified acrylate emulsion of the present invention can be advantageously used as a paint, an undercoating or finish coating material for building materials, an adhesive, a pressure-sensitive adhesive, a processing agent for papers, or a finish coating material for textile fabrics. Especially, the aqueous, silicone-modified acrylate emulsion of the present invention can be advantageously used as a paint, or a finish coating material for building materials.

If desired, other components, which are conventionally used in a aqueous paints, e.g., a coating formation promoter, a thickening agent, an anti-foaming agent, a pigment, a dispersant, a dye and an antiseptic agent, can be added to the aqueous, silicone-modified acrylate polymer emulsion of the present invention.

Best Mode for Carrying Out the Invention

Hereinbelow, the present invention will be described in more detail with reference to the following Examples and Comparative Examples, but they should not be construed as limiting the scope of the present invention.

In Examples and Comparative Examples, the "part(s)" and "%" are given by weight unless otherwise specified. Further, with respect to the properties of the aqueous, silcone-modified acrylate polymer emulsions obtained in Examples and Comparative Examples, sample paints having the following composition were prepared using respective emulsions, and examination was made in accordance with the methods described below.

| Composition for paint | |
|---|---:|
| Pigment dispersion | |
| Water | 82.5 parts |
| Poiz 530 (dispersant: manufactured and sold by Kao Corp., Japan) | 7.5 parts |
| 5% aqueous solution of sodium tripolyphosphate | 7.5 parts |
| 3% aqueous solution of Daicel HEC SP-600 (thickening agent: manufactured and sold by Daicel Chemical Industries, Ltd., Japan) | 25.0 parts |
| Nopco 1497VD (anti-foaming agent: manufactured and sold by San Nopco K.K., Japan) | 2.5 parts |
| Tipaque R-930 (rutile titanium oxide: manufactured and sold by ISHIHARA SANGYO KAISHA, LTD., Japan) | 375.0 parts |
| Let-down components | |
| Emulsion (solids component) | 460.0 parts |
| Ethylene glycol monobutyl ether | 60.0 parts |
| Ethylene glycol mono(2-ethylhexyl) ether | 10.0 parts |
| Water | 30.0 parts |
| Nopco 1497VD | 1.0 parts |

Examination Method (i) Initial gloss value and gloss retentivity The above-mentioned pigment dispersion and let-down components are mixed, thereby preparing a paint. The obtained paint was coated on an anodized alminium plate (anodized by sulfuric acid) by means of wire coater No. 50, and dried at room temperature for 30 days. The initial gloss value of the coated paint (coating) was measured in terms of the 60°–60° mirror reflectance (%) (each of angle of incidence and angle of reflection: 60°) (the time when the measurement was conducted is defined as the initiation time of examination, i.e., 0 hour after the initiation of the examination). Subsequently, the coating was subjected to an exposure test (rainfall cycle: 12 min/hr; temperature of black panel: 60–66° C.) by means of a sunshine-type weatherometer (WEL-SUN-DC: manufactured and sold by Suga Shiken-ki K. K., Japan). The final gloss value of the coating was measured in terms of the 60° –60° mirror reflectance (%) after 3000 hours of exposure. The percentage of the final gloss value based on the initial gloss value is defined as the gloss retentivity.

(ii) Water resistance

A paint prepared in substantially the same manner as in (i) above was coated on an anodized alminium plate (anodized by sulfuric acid) by means of wire coater No. 50 and dried at room temperature for 2 hours. The coated paint was further dried at 50° C. for 2 days and, then, immersed in water having a temperature of 40° C. for 30 days. The condition of the coated paint (coating) was evaluated by visual observation in terms of the following 4 criteria.

Criteria

⊚: No blistering or lowering of luster is observed.

○: Slight blistering is observed, but no lowering of luster is observed.

Δ: Blistering and lowering of luster are observed.

X: Blistering is observed on overall surface of the coating, and luster is markedly lowered.

Example 1

0300 Parts of water, 52 parts of methyl methacrylate, 40 parts of butyl acrylate, 8 parts of methacrylic acid and 20 parts of a 20% aqueous solution of Latemul S-180A (ammonium salt of diester of sulfosuccinic acid, which has a double bond and is copolymerizable with an ethylenically unsaturated monomer) (manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, 2 types of liquid mixtures, i.e., a liquid mixture of 330 parts of water, 207 parts of methyl methacrylate, 190 parts of butyl acrylate, 3 parts of methacrylic acid, 20 parts of a 20 % aqueous solution of Latemul S-180A and 1.0 part of ammonium persulfate, and a liquid mixture of 2.5 parts of γ-methacryloxypropyltrimethoxysilane, 25 parts of dimethyldimethoxysilane and 25 parts of methyltrimethoxysilane, were individually dropped into the reactor from separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85 ° C. and the mixture was allowed to stand for 6 hours. After cooling the mixture in the reactor to room temperature, the hydrogen ion concentration thereof was measured to give a pH value of 2.1. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02 % by weight (on a dry basis), based on the total weight of the monomers. With respect to the obtained emulsion, the solids content of the emulsion was 44.0 %, and the average particle diameter of the dispersed phase of the emulsion was 1080 Å. Using this emulsion, a paint was prepared, and the paint thus prepared was examined with respect to the initial gloss value, gloss retentivity and water resistance. Results are shown in Table 1.

Example 2

300 Parts of water, 37 parts of methyl methacrylate, 40 parts of butyl acrylate, 15 parts of cyclohexyl methacrylate, 8 parts of methacrylic acid and 20 parts of a 20% aqueous solution of Latemul S-180A (ammonium salt of diester of sulfosuccinic acid, which has a double bond and is copolymerizable with an ethylenically unsaturated monomer) (manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, 2 types of liquid mixtures, i.e., a liquid mixture of 330 parts of water, 177 parts of methyl methacrylate, 160 parts of butyl acrylate, 60 parts of cyclohexyl methacrylate, 3 parts of methacrylic acid, 20 parts of a 20% aqueous solution of Latemul S-180A and 1.0 part of ammonium persulfate, and a liquid mixture of 2.5 parts of 7-methacryloxypropyltrimethoxysilane, 25 parts of dimethyldimethoxysilane and 25 parts of methyltrimethoxysilane, were individually dropped into the reactor from separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.1. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02% by weight (on a dry basis), based on the total weight of the monomers. With respect to the obtained emulsion, the solids content of the emulsion was 44.0%, and the average particle diameter of the dispersed phase of the emulsion was 1080 Å. Using this emulsion, a paint was prepared, and the paint thus prepared was examined with respect to the initial gloss value, gloss retentivity and water resistance. Results are shown in Table 1.

Comparative Example 1

300 Parts of water, 52 parts of methyl methacrylate, 40 parts of n-butyl acrylate, 8 parts of methacrylic acid, 4 parts of a 40% aqueous solution of sodium dioctylsulfosuccinate (Pelex® OT-P: manufactured and sold by Kao Corp., Japan) and 1 part of a 25% aqueous solution of polyoxyethylene nonylphenyl ether (Emulgen® 950:manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, 2 types of liquid mixtures, i.e., a liquid mixture of 330 parts of water, 207 parts of methyl methacrylate, 190 parts of n-butyl acrylate, 3 parts of methacrylic acid, 5 parts of a 25% aqueous solution of polyoxyethylene nonylphenyl ether (Emulge® 950:manufactured and sold by Kao Corp., Japan) and 1.0 part of ammonium persulfate, and a liquid mixture of 2.5 parts of γ-methacryloxypropyltrimethoxysilane, 25 parts of dimethyldimethoxysilane and 25 parts of methyltrimethoxysilane, were individually dropped into the reactor from separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.2. A 25 % aqueous solution of ammonia was added to the mixture in the reactor to thereby adjust the pH value thereof to 8. Then, the resultant mixture was filtered by means of a 100-mesh metal wire net to thereby obtain a final emulsion. The amount of filtered-off aggregates was as small as 0.02% by weight (on a dry basis), based on the total weight of the monomers. With respect to the obtained emulsion, the solids content of the emulsion was 44.1%, and the average particle diameter of the dispersed phase of the emulsion was 1050 Å. Using this emulsion, a paint was prepared, and the paint thus prepared was examined with respect to the initial gloss value, gloss retentivity and water resistance. Results are shown in Table 1.

Comparative Example 2

300 Parts of water, 52 parts of methyl methacrylate, 40 parts of butyl acrylate, 8 parts of methacrylic acid and 20 parts of a 20% aqueous solution of Latemul S-180A (ammonium salt of diester of sulfosuccinic acid, which has a double bond and is copolymerizable with an ethylenically unsaturated monomer) (manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, a liquid mixture of 330 parts of water, 207 parts of methyl methacrylate, 190 parts of butyl acrylate, 3 parts of methacrylic acid, 20 parts of a 20% aqueous solution of Latemul S-180A and 1.0 part of ammonium persulfate, and 50 parts of dimethyldimethoxysilane were individually dropped into the reactor from separate dropping tanks over 3 hours. During the dropping of the above-mentioned liquid mixture and dimethyldimethoxysilane into the reactor, the temperature in the reactor was maintained at 80° C. After completion of the dropping of the liquid mixture and dimethyldimethoxysilane into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.1. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02% by weight (on a dry basis), based on the total weight of the monomers. With respect to the obtained emulsion, the solids content of the emulsion was 43.5%, and the average particle diameter of the dispersed phase of the emulsion was 980 Å. Using this emulsion, a paint was prepared, and the paint thus prepared was examined with respect to the initial gloss value, gloss retentivity and water resistance. Results are shown in Table 1.

Comparative Example 3

300 Parts of water, 52 parts of methyl methacrylate, 40 parts of butyl acrylate, 8 parts of methacrylic acid and 20 parts of a 20% aqueous solution of Latemul S-180A (ammonium salt of diester of sulfosuccinic acid, which has a double bond and is copolymerizable with an ethylenically unsaturated monomer) (manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, a liquid mixture of 330 parts of water, 207 parts of methyl methacrylate, 190 parts of butyl acrylate, 3 parts of methacrylic acid, 20 parts of a 20% aqueous solution of Latemul S-180A and 1.0 part of ammonium persulfate was dropped into the reactor from a dropping tank over 3 hours. During the dropping of the above-mentioned liquid mixture into the reactor, the temperature in the reactor was maintained at 80° C. After completion of the dropping of the liquid mixture into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.1. A 25 % aqueous solution of ammonia was added to the mixture in the reactor to thereby adjust the pH value thereof to 8. Then, the resultant mixture was filtered by means of a 100-mesh metal wire net to thereby obtain a final emulsion. The amount of filtered-off aggregates was as small as 0.02% by weight (on a dry basis), based on the total weight of the monomers. With respect to the obtained emulsion, the solids content of the emulsion was 43.0%, and the average particle diameter of the dispersed phase of the emulsion was 1080Å. Using this emulsion, a paint was prepared, and the paint thus prepared was examined with respect to the initial gloss value, gloss retentivity and water resistance. Results are shown in Table 1.

Example 3

300 Parts of water, 37 parts of methyl methacrylate, 40 parts of n-butyl acrylate, 15 parts of cyclohexyl methacrylate, 8 parts of methacrylic acid and 20 parts of a 20% aqueous solution of Latemul S-180A (ammonium salt of diester of sulfosuccinic acid, which has a double bond and is copolymerizable with an ethylenically unsaturated monomer) (manufactured and sold by Kao Corp., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.9. Then, a liquid mixture of 2.5 parts of γ-methacryloxypropyltrimethoxysilane, 25 parts of dimethyldimethoxysilane and 25 parts of methyltrimethoxysilane was dropped into the reactor from a dropping tank over 5 minutes. Subsequently, a liquid mixture of 330 parts of water, 180 parts of methyl methacrylate, 160 parts of butyl acrylate, 60 parts of cyclohexyl methacrylate, 20 parts of a 20% aqueous solution of Latemul S-180A and 1.0 part of ammonium persulfate was dropped into the reactor from another dropping tank over 3 hours. During the dropping of the above-mentioned liquid mixtures into the reactor, the temperature in the reactor was maintained at 80° C.

After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof was measured to obtain a pH value of 2.1. A 25 % aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02% by weight (on a dry basis), based on the total weight of the monomers. With respect to the obtained emulsion, the solids content of the emulsion was 44.0%, and the average particle diameter of the dispersed phase of the emulsion was 970 Å. Using this emulsion, a paint was prepared, and the paint thus prepared was examined with respect to the initial gloss value, gloss retentivity and water resistance. Results are shown in Table 1.

Example 4

400 Parts of water, 122 parts of n-butyl methacrylate, 60 parts of methyl methacrylate, 18 parts of methacrylic acid and 30 parts of a 20% aqueous solution of Latemul S-180A were charged in a reactor having a stirrer, a reflux condenser, dropping tanks and a thermometer. After elevating the temperature in the reactor to 78° C., 1.0 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.7. Then, a liquid mixture of 50 parts of dimethyldimethoxysilane and 50 parts of methyltrimethoxysilane was dropped into the reactor from a dropping tank over 5 minutes, while maintaining the temperature in the reactor at 60° C. and the resultant mixture was allowed to stand at 80 C. for 2 hours. Subsequently, a liquid mixture of 230parts of water, 140parts of n-butyl methacrylate, 150parts of cyclohexyl methacrylate, 10 parts of methacrylic acid, 18 parts of a 20% aqueous solution of sodium p-styrenesulfonate, 2 parts of a 20% aqueous solution of sodium dodecylbenzenesulfonate and 1.0 part of ammonium persulfate, and 2.5 parts of γ-methacryloxypropyltrimethoxysilane were individually dropped into the reactor from separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.0. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02% by weight (on a dry basis), based on the total weight of the monomers. With respect to the obtained emulsion, the solids content of the emulsion was 45.4%, and the average particle diameter of the dispersed phase of the emulsion was 1020 Å. Using this emulsion, a paint was prepared, and the paint thus prepared was examined with respect to the initial gloss value, gloss retentivity and water resistance. Results are shown in Table 1.

Example 5.

300 Parts of water, 40 parts of cyclohexyl acrylate, 15 parts of 2-hydroxycyclohexyl methacrylate, 30 parts of 2-ethylhexyl acrylate, 15 parts of acrylic acid and 20 parts of a 25 % aqueous solution of Adeca Rea soap SE-1025N (manufactured and sold by ASAHI DENKA KOGYO K. K., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.8. Then, a liquid mixture of 25 parts of dimethyldimethoxysilane and 25 parts of methyltrimethoxysilane was dropped into the reactor from a dropping tank over 5 minutes, while maintaining the temperature in the reactor at 60° C., and the resultant mixture was allowed to stand at 80° C. for 2 hours. Subsequently, a liquid mixture of 330 parts of water, 280 parts of cyclohexyl acrylate, 120 parts of 2-ethylhexyl acrylate, 18 parts of 25% aqueous solution of Adeka Rea soap SE-1025N, 2 parts of a 20% aqueous solution of sodium dodecylbenzenesulfonate and 1.0 part of ammonium persulfate, and 2.5 parts of γ-methacryloxypropyltrimethoxysilane were individually dropped into the reactor from separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof was measured to give a pH value of 2.0. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. The amount of filtered-off aggregates was as small as 0.02% by weight (on a dry basis), based on the total weight of the monomers. With respect to the obtained emulsion, the solids content of the emulsion was 44.0%, and the average particle diameter of the dispersed phase of the emulsion was 1190 Å. Using this emulsion, a paint was prepared, and the paint thus prepared was examined with respect to the initial gloss value, gloss retentivity and water resistance. Results are shown in Table 1.

Examples 6 through 10

(1) Preparation of a preliminary aqueous acrylate polymer emulsion having a seed latex dispersed therein 381.5 Parts of water, 40 parts of butyl acrylate, 40 parts of methyl methacrylate, 5 parts of itaconic acid, 10 parts of methacrylic acid, 5 parts of styrene and 18 parts of a 25% aqueous solution of Aquaron HS-10 (ammonium salt of sulfuric acid ester of polyoxyethylene alkylphenyl ether, which has a double bond and is copolymerizable with an ethylenically unsaturated monomer) (manufactured and sold by Dai-ichi Kogyo Seiyaku Co., Ltd., Japan) were charged in a reactor having a stirrer, a reflux condenser, dropping tanks and a thermometer. After elevating the temperature in the reactor to 78° C., 0.5 part of ammonium persulfate was added to the reactor, and the resultant mixture was allowed to stand for 1 hour, thereby obtaining a preliminary aqueous acrylate polymer emulsion having a seed latex dispersed therein. The hydrogen ion concentration of the obtained preliminary aqueous acrylate polymer emulsion was measured to give a pH value of 1.7.

(2) Preparation of emulsions (a) to (e)

In each of Examples 6 through 10, a liquid mixture of a predetermined amount (indicated in Table 2) of the above-obtained preliminary aqueous acrylate polymer emulsion (having a seed latex dispersed therein), 80 parts of a 25% aqueous solution of Aquaron HS-10 as an emulsifier, 5.0 parts of ammonium persulfate, 655 parts of water and monomers indicated in Table 2 as monomer system (A), and hydrolyzable silanes indicated in Table 2 were individually dropped into the reactor from two separate dropping tanks over 3 hours. During the dropping of the above-mentioned liquid mixtures into the reactor, the temperature in the reactor was maintained at 80° C. After completion of the dropping of the liquid mixtures into the reactor, the temperature in the reactor was elevated to 85° C. and the mixture was allowed to stand for 6 hours. After cooling the mixture in the reactor to room temperature, the hydrogen ion concentration thereof in each Example was individually measured to obtain a respective pH value which was in the range of from 1.5 to 2.5. A 25% aqueous solution of ammonia was added to the mixture in the reactor to thereby adjust the pH value thereof to 8. Then, the resultant mixture was filtered by means of a 100-mesh metal wire net to thereby obtain a final aqueous, silicone-modified acrylate polymer emulsion. With respect to each of the emulsions obtained in Examples 6 through 10, the amount of filtered-off aggregates was as small as 0.5% by weight or less (on a dry basis), based on the total weight of the monomers. Using these emulsions, paints were prepared, respectively, and the paints thus prepared were examined with respect to the initial gloss value, gloss retentivity and water resistance. Results are shown in Table 2.

(3) Results of the examination

Emulsions (a) to (e) obtained respectively in Examples 6 to 10 exhibited excellent initial gloss value, gloss retentivity and water resistance.

TABLE 1

|  | Examples |  |  |  |  | Comparative Examples |  |  |
|---|---|---|---|---|---|---|---|---|
|  | 1 | 2 | 3 | 4 | 5 | 1 | 2 | 3 |
| Initial gloss value (%) | 81 | 84 | 82 | 84 | 80 | 79 | 65 | 80 |
| Gloss retentivity (%) | 80 | 98 | 95 | 96 | 91 | 85 | 60 | 48 |
| Water resistance | ⊚ | ⊚ | ⊚ | ⊚ | ⊚ | × | ⊚ | ⊚ |

Criterion for evaluation of water resistance
⊚: No blistering or lowering of luster is observed.
○: Slight blistering is observed, but no lowering of luster is observed.*
Δ: Blistering and lowering of luster are observed.*
×: Blistering occurs on overall surface and luster is markedly lowered.
*Among the paints prepared in Examples and Comparative Examples, no paints were found which were evaluated as ○ or Δ.

TABLE 2

| Examples | 6 | 7 | 8 | 9 | 10 |
|---|---|---|---|---|---|
| Emulsions | a | b | c | d | e |
| Preliminary aqueous acrylate polymer emulsion having a seed latex dispersed therein (parts by weight) | 1000 | 1000 | 1000 | 200 | 200 |
| [Monomers used as a monomer system (A)] (parts by weight) |  |  |  |  |  |
| n-butyl acrylate | 390 | 390 | 390 | 350 |  |
| 2-ethylhexyl acrylate |  |  |  |  | 350 |
| Methyl methacrylate | 590 | 590 | 590 | 585 | 585 |
| Styrene |  |  |  | 50 | 50 |
| Methacrylic acid | 20 | 20 | 20 | 15 | 15 |
| [Aqueous solution containing monomers used as an emulsifier (B)] (parts by weight) |  |  |  |  |  |
| 25% aqueous solution of Aquaron HS-10 | 80 | 80 | 80 | 80 | 80 |
| [Hydrolyzable silanes used as a modifier (C)] (parts by weight) |  |  |  |  |  |
| γ-methacryloxypropyl-trimethoxysilane |  |  |  | 5 | 5 |
| Methyltriethoxysilane | 100 | 45 | 45 | 50 | 50 |
| Dimethyldiethoxysilane |  | 100 |  | 50 |  |
| Octamethylcyclotetra-siloxane |  |  | 200 |  | 50 |
| [Examination items] |  |  |  |  |  |
| Initial gloss value (%) | 79 | 82 | 78 | 76 | 77 |
| Gloss retentivity (%) | 80 | 85 | 85 | 91 | 76 |
| Water resistance | ⊚ | ⊚ | ⊚ | ⊚ | ⊚ |

INDUSTRIAL APPLICABILITY

The aqueous, silicone-modified acrylate polymer emulsion of the present invention is capable of forming such an excellent coating as has not conventionally been achieved, i.e., a coating having excellent water repellency, water resistance, weatherability, dispersion characteristics of pigment, gloss retentivity, stain resistance and adhesion properties. Therefore, the aqueous, silicone-modified acrylate polymer emulsion of the present invention can be advantageously used as a paint, an undercoating or finish coating material for building materials, an adhesive, a pressure-sensitive adhesive, a processing agent for papers, or a finish coating material for textile fabrics. Especially, the aqueous, silicone-modified acrylate polymer emulsion of the present invention can be advantageously used as a paint, or a finish coating material for building materials.

What is claimed is:

1. An aqueous, silicone-modified acrylate polymer emulsion, which is an acrylate polymer emulsion produced by subjecting a monomer system (A) to emulsion polymerization in an aqueous medium in the presence of an emulsifier (B), wherein said acrylate polymer emulsion is silicone-modified using a silicone structure-containing modifier (C) during or after said emulsion polymerization, and wherein each of the emulsion polymerization and the silicone modification of the acrylate polymer emulsion is performed at a pH of 4.0 or less;

wherein said monomer system (A) comprises an acrylate monomer selected from the group consisting of an acrylic ester, a methacrylic ester and a mixture thereof, said acrylate monomer containing 5% by weight or more based on the weight of said monomer system (A), of a $C_5$–$C_{12}$ cycloalkyl ester of acrylic acid, a $C_5$–$C_{12}$ cycloalkyl ester of methacrylic acid, or a mixture thereof;

wherein said emulsifier (B) is selected from the group consisting of a sulfonic acid group-containing ethylenically unsaturated monomer, a sulfonate group-containing ethylenically unsaturated monomer, and a mixture thereof;

wherein said silicone structure-containing modifier (C) comprises a silicone structure-containing silane (I) represented by the formula:

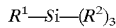

wherein $R^1$ represents a hydrogen atom, a $C_1$–$C_{16}$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, and each $R^2$ independently represents a C1–C8 alkoxyl group, an acetoxyl group or a hydroxyl group; and wherein said monomer system (A) and said emulsifier (B) are, respectively, used in an amount of from 80% to 99.95% by weight and in an amount of from 0.05% to 20% by weight, based on the total weight of monomer system (A) and emulsifier (B), and said silicone structure-containing modifier (C) is used in an amount which satisfies the following relationship:

$$\frac{1}{2} \leq \frac{(A)+(B)}{(C)} \leq \frac{99}{1}$$

wherein (A), (B) and (C), respectively, represent the amount of monomer system (A), emulsifier (B) and modifier (C) in weight percent based on the total weight of materials (A), (B) and (C).

2. The aqueous, silicone-modified acrylate polymer emulsion according to claim 1, wherein the ratio of the total weight of said monomer system (A), said emulsifier (B) and said modifier (C) to the weight of said aqueous medium is 75/25 or less.

3. The aqueous, silicone-modified acrylate polymer emulsion according to claim 1, wherein said monomer system (A) further comprises a comonomer copolymerizable with said acrylate monomer, said comonomer being at least one member selected from the group consisting of an acrylamide monomer, a methacrylamide monomer, a vinyl monomer and a carboxylic acid group-containing ethylenically unsaturated monomer, and wherein said acrylate monomer and said comonomer are, respectively, present in an amount of from 90% to less than 100% by weight and in an amount of from 10% by weight or less, based on the total weight of said acrylate monomer and said comonomer.

4. The aqueous, silicone-modified acrylate polymer emulsion according to claim 3 wherein said comonomer of said monomer system (A) is a carboxylic acid group-containing ethylenically unsaturated monomer.

5. The aqueous, silicone-modified acrylate polymer emulsion according to claim 4, wherein said carboxylic acid group-containing ethylenically unsaturated monomer is at least one member selected from the group consisting of acrylic acid, methacrylic acid, itaconic acid and a half ester thereof, fumaric acid and a half ester thereof, and maleic acid and a half ester thereof.

6. The aqueous, silicone-modified acrylate polymer emulsion according to claim 1, wherein said sulfonic acid group-containing ethylenically unsaturated monomer or said sulfonate group-containing ethylenically unsaturated monomer of said emulsifier (B) is a radically polymerizable double bond-containing compound having a sulfonic acid group, or an ammonium or an alkali metal salt thereof.

7. The aqueous, silicone-modified acrylate polymer emulsion according to claim 6, wherein said sulfonic acid group-containing ethylenically unsaturated monomer or said sulfonate group-containing ethylenically unsaturated monomer of said emulsifier (B) is a radically polymerizable double bond-containing compound having a substituent selected from the group consisting of a $C_1$–$C_{20}$ alkyl group, a $C_2$–$C_4$ alkyl ether group, a poly–$C_2$–$C_4$ alkyl ether group, a $C_6$ or $C_{10}$ aryl group, and a succinic acid group, each of which is substituted with a sulfonic acid group which is in the form of an ammonium, a sodium or a potassium salt thereof, or a vinyl sulfonate compound having a vinyl group bonded to a sulfonic acid group which is in the form of an ammonium, a sodium or a potassium salt thereof.

8. The aqueous, silicone-modified acrylate polymer emulsion according to claim 1, wherein said silicone structure-containing modifier (C) further comprises at least one member selected from the group consisting of a cyclic silane, a hydrolyzable group-containing linear siloxane and a silane (II) represented by the formula:

wherein each $R^3$ independently represents a hydrogen atom, a $C_1$–$C_{16}$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, each $R^4$ independently represents a $C_1$–$C_8$ alkoxy group, an acetoxy group or a hydroxyl group, and n is 0, 2 or 3; and wherein the molar ratio of said silane (I) to said at least one member selected from the group consisting of a cyclic silane, a hydrolyzable group-containing linear siloxane and a silane (II) is at least 10/100.

9. The aqueous, silicone-modified acrylate polymer emulsion according to claim 1, wherein said silicone structure-containing modifier (C) further comprises at least one member selected from the group consisting of a cyclic silane and a silane (III) represented by the formula:

wherein each $R^3$ independently represents a hydrogen atom, a $C_1$–$C_{16}$ aliphatic hydrocarbon group, a $C_5$–$C_{10}$ aryl group, a $C_5$–$C_6$ cycloalkyl group, a vinyl group, an acrylic $C_1$–$C_{10}$ alkyl group or a methacrylic $C_1$–$C_{10}$ alkyl group, and each $R^4$ independently represents a $C_1$–$C_8$ alkoxy group, an acetoxy group or a hydroxyl group; and wherein the molar ratio of said silane (I) to said at least one member selected from the group consisting of a cyclic silane and a silane (III) is at least 10/100.

10. The aqueous, silicone-modified acrylate polymer emulsion according to claim 1, wherein said modifier (C) is added to a system of said emulsion polymerization, so that the silicone-modification of said emulsion is performed during said emulsion polymerization.

11. The aqueous, silicone-modified acrylate emulsion according to claim 1, wherein said monomer system (A) is comprised of monomer system ($A^1$) and ($A^2$), each comprising said acrylate monomer, and said emulsifier (B) is comprised of emulsifiers ($B^1$) and ($B^2$), each selected from the group consisting of said sulfonic acid group-containing ethylenically unsaturated monomer, said sulfonate group-containing ethylenically unsaturated monomer, and said mixture thereof, with the proviso that monomer systems ($A^1$) and ($A^2$) are the same or different, and emulsifiers ($B^1$) and ($B^2$) are the same or different, and wherein said emulsion polymerization is conducted in a sequence of step (1) and step (2), wherein in step (1), said monomer system ($A^1$) is subjected to emulsion polymerization in an aqueous medium in the presence of said emulsifier ($B^1$) to thereby obtain a preliminary aqueous acrylate polymer emulsion having a seed latex dispersed therein, and in step (2), said monomer system ($A^2$) and said emulsifier ($B^2$), optionally with an aqueous medium, are added to said preliminary aqueous acrylate polymer emulsion to effect emulsion polymerization thereof, thereby producing a final aqueous acrylate polymer emulsion, wherein said silicone-modification is performed using said silicone structure-containing modifier (C) during or after said emulsion polymerization.

12. The aqueous, silicone-modified acrylate polymer emulsion according to claim 11, wherein said modifier (C) is added in step (2) to perform the silicone-modification during the emulsion polymerization.

13. The aqueous, silicone-modified acrylate polymer emulsion according to claim 11, wherein said final aqueous acrylate emulsion is treated with said modifier (C) to perform said silicone-modification after said emulsion polymerization.

14. The aqueous, silicone-modified acrylate polymer emulsion according to claim 11, wherein in step (1), said monomer system ($A^1$) and said emulsifier ($B^1$) are, respectively, used in an amount of from 80 to 99.95% by weight and in an amount of from 20 to 0.05% by weight, based on the total weight of monomer system ($A^1$) and emulsifier ($B^1$); and wherein in step (2), said monomer system ($A^2$) and said emulsifier ($B^2$) are, respectively, used in an amount of from 80 to 99.95% by weight and in an amount of from 20 to 0.05% by weight, based on the total weight of monomer system ($A^2$) and emulsifier ($B^2$), wherein said silicone structure-containing modifier (C) is used in an amount which satisfies the following relationships:

$$\frac{1}{2} \leq \frac{(A^1) + (A^2) + (B^1) + (B^2)}{(C)} \leq \frac{99}{1}$$

wherein ($A^1$), ($A^2$), ($B^1$), ($B^2$) and (C), respectively, represent amounts of monomer system ($A^1$), monomer system (A2), emulsifier ($B^1$), emulsifier (B2) and modifier (C) in terms of weight percentages based on the total weight of materials ($A^1$), ($A^2$), ($B^1$), ($B^2$) and (C), and wherein the ratio of the total weight of said monomer system ($A^1$) and emulsifier (B1) to the total weight of said monomer system ($A^2$) and emulsifier ($B^2$) is from 1/99 to 99/1.

15. The aqueous, silicone-modified acrylate emulsion according to claim 14, wherein in step (1), said monomer system ($A^1$) contains 0.5 to 30% by weight of a carboxylic acid group-containing ethylenically unsaturated monomer, based on the weight of said monomer system ($A^1$).

16. The aqueous, silicone-modified acrylate emulsion according to any claim 1, which is a paint, an undercoating or finish coating material for building materials, an adhesive, a pressure-sensitive adhesive, a processing agent for papers, or a finish coating material for textile fabrics.

17. The aqueous, silicone-modified acrylate emulsion according to claim 16, which is a paint, or a finish coating material for building materials.

* * * * *

UNITED STATES PATENT AND TRADEMARK OFFICE
CERTIFICATE OF CORRECTION

PATENT NO. : 5,852,095

DATED : December 22, 1998

INVENTOR(S) : Yamauchi et al.

It is certified that error appears in the above-identified patent and that said Letters Patent is hereby corrected as shown below:

In column 4, line 57, "Veo Va." should be changed to --Veo Va--.

In column 7, line 5, "Aquaro®" should be changed to --Aquaron®--.

In column 9, line 28, "C1-Cl$_6$" should be changed to --$C_1$-$C_{16}$--.

In column 9, line 29, "C5" should be changed to --$C_5$--.

In column 14, lines 52, 64 and 65, "°C." should be changed to --°C--.

In column 15, line 11, "0300" should be changed to --300--.

In column 15, lines 19 and 67, "°C." should be changed to --°C--.

In column 16, line 47, "°C." should be changed to --°C--.

In column 16, line 58, "Emulge®" should be changed to --Emulgen®--.

In column 17, lines 28 and 46, "°C." should be changed to --°C--.

In column 18, lines 7, 23 and 51, "°C." should be changed to --°C--.

In column 19, lines 5, 29, 39, 40 and 53, "°C." should be changed to --°C--.

UNITED STATES PATENT AND TRADEMARK OFFICE
CERTIFICATE OF CORRECTION

PATENT NO. : 5,852,095

DATED : December 22, 1998

INVENTOR(S) : Yamauchi et al.

It is certified that error appears in the above-identified patent and that said Letters Patent is hereby corrected as shown below:

In column 20, lines 13, 23 and 24, "°C." should be changed to --°C--.

In column 21, line 2, "°C." should be changed to --°C--.

In column 23, line 20, "C1-C8" should be changed to --$C_1$-$C_8$--.

In column 26, line 14, "(A2)" should be changed to --$(A^2)$--; "(B2)" should be changed to --$(B^2)$--.

In column 26, line 19, "(B1)" should be changed to --$(B^1)$--.

In column 26, line 28, "any claim 1" should be changed to --claim 1--.

Signed and Sealed this

Fourth Day of May, 1999

Q. TODD DICKINSON

Attest:

Attesting Officer

Acting Commissioner of Patents and Trademarks